Jan. 9, 1962 S. F. BRIGHT 3,015,929
LAWN MOWER AND RAKE
Filed Feb. 10, 1959

INVENTOR.
Samuel F. Bright
BY
Victor J. Evans & Co.
ATTORNEYS

United States Patent Office 3,015,929
Patented Jan. 9, 1962

3,015,929
LAWN MOWER AND RAKE
Samuel F. Bright, 809 N. 5th, Ottumwa, Iowa
Filed Feb. 10, 1959, Ser. No. 792,435
2 Claims. (Cl. 56—193)

This invention relates to a lawn mower, and more particularly to a rake for a lawn mower.

The object of the invention is to provide a lawn mower of the type which includes a horizontally disposed rotary blade, and wherein according to the present invention members are affixed to the blade so that as the blade rotates, grass, cuttings or the like will be moved or raked up or otherwise shifted in position.

Another object of the invention is to provide a rake for a lawn mower wherein as the cutting blade of the lawn mower is actuated or rotated, the rakes will be moved to thereby move the grass or other material to the desired location, as for example the cut grass or leaves or other material can be automatically moved or deposited in a suitable receptacle.

A further object of the invention is to provide a rotary lawn mower rake which is extremely simple and inexpensive to manufacture.

Other objects and advantages will be apparent during the course of the following description.

In the accompanying drawings, forming a part of this application, and in which like numerals are used to designate like parts throughout the same:

Figure 1:
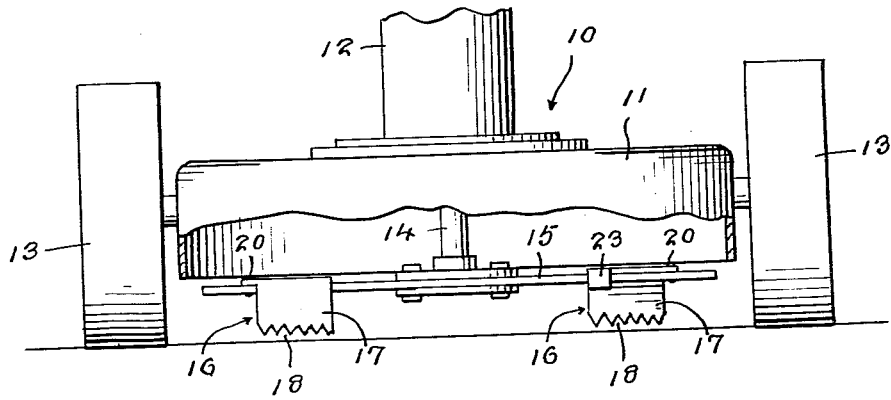
FIGURE 1 is an elevational view of the lawn mower equipped with the rakes of the present invention, and with parts broken away and in section.
Figure 2:
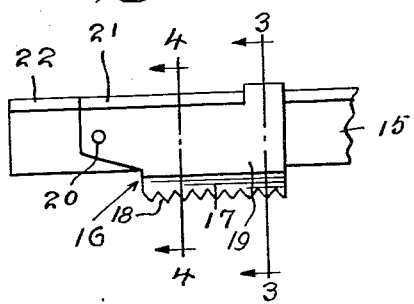
FIGURE 2 is a fragmentary plan view showing one of the rakes or members affixed to the rotary blade.

Referring in detail to the drawings, the numeral 10 indicates a conventional lawn mower which includes a frame 11, and the lawn mower 10 further includes a motor 12 which may be of the gasoline or electric type, and there is also provided wheels 13. A vertically disposed shaft 14 is driven by the motor 12, and a horizontally disposed rotary blade 15 is secured to the lower end of the shaft 14.

As shown in the drawings, there is affixed to the blade 15 a pair of body members or rakes 16, which each have the same construction. Each of the members 16 includes a first portion 17 which is provided with a plurality of teeth 18, and there is further provided a second portion 19 which is horizontally disposed, the portions 19 and 17 being arranged angularly with respect to each other. The portion 19 of the member 16 is affixed to the blade 15 in any suitable manner, as for example by means of a securing element such as the rivet 20. The rake 16 is further provided with a sharp cutting edge 21 which is arranged contiguous to the cutting edge 22 of the rotary blade 15.

Figure 3:
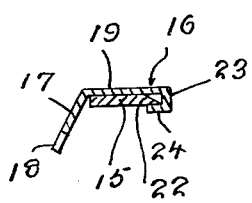
FIGURE 3 is a sectional view taken on the line 3—3 of FIGURE 2.
Figure 4:
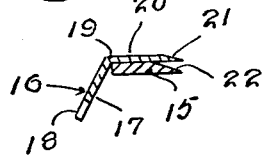
FIGURE 4 is a sectional view taken on the line 4—4 of FIGURE 2.
Figure 5:
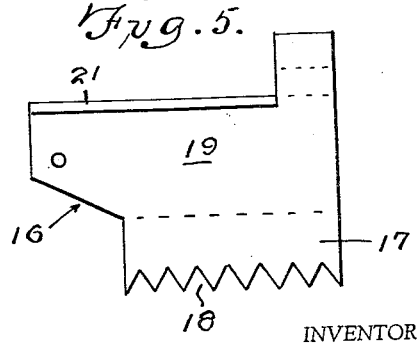
FIGURE 5 is an enlarged plan view showing the rake before it is bent and affixed to the blade.

Depending from the portion 19 is a third portion 23, FIGURE 3, and arranged at right angles with respect to the lower end of the third portion 23 is a fourth portion 24. The portions 19, 23 and 24 function to define a clamp which helps hold the member 16 in its proper position on the rotary blade 15. As shown in FIGURE 5, the member 16 may be provided with portions such as the portions 17, 24 and 23 which can be conveniently folded or bent so that the device is properly positioned on the blade 15. In other words, the attachment is adapted to be made so that it will slide over the end of the blade and into place after it has been bent.

From the foregoing, it is apparent that there has been provided a lawn mower accessory or attachment wherein as the lawn mower such as the lawn mower 10 moves along the grass or ground, the motor 12 will rotate the shaft 14 which in turn will cause rotation of the blade 15. As the blade 15 turns, it rotates a pair of rakes 16 so that the teeth 18 will engage the grass, leaves or other material and this material will then be moved around. Then, with a suitable grass receptacle or receiver attached to the frame 11, it will be seen that the leaves or cut grass will be raked up or moved along the ground by the teeth 18 and this cut grass will be thrown outwardly and deposited in such a receptacle whereby the grass will be simultaneously cut and swept or raked into a convenient receptacle which can be conveniently emptied when desired.

Each of the body members 16 is provided with a sharp edge portion 21 which is arranged just above a portion of the cutting edge 22 of the blade 15 so that as the blade 15 turns, the edge portions 21 will coact with the edge portion 22 to insure that the grass or other growing material will be properly cut. The portions 23 and 24 cooperate with the rivet 20 to help maintain the member 16 fastened to the blade 15. The portion 17 is arranged at an angle with respect to the portion 19 so that the grass will be properly raked or swept up.

The parts can be made of any suitable material and in different shapes or sizes.

The present invention is safe to use and will permit a person to keep the lawn or other area in a more attractive arrangement.

The present invention will increase the efficiency and usefulness of a lawn mower to which it is attached. The device rakes the grass at the same time that the grass is mowed and can be attached to any rotary lawn mower without any difficulty. The device is adapted to be attached to rotary type lawn mowers for the purpose of simultaneously mowing or cutting grass, and raking leaves and other material in one operation. As stated previously, the present invention can be used with a suitable receptacle for catching the material that is cut and raked. Thus, the material which is cut such as leaves, grass or other similar material will be cut and thrown outwardly and thus the lawn will be left in a clean attractive condition.

Minor changes in shape, size and rearrangement of details coming within the field of invention claimed may be resorted to in actual practice, if desired.

I claim:

1. In a lawn mower and rake, a horizontally disposed rotary blade having longitudinally extending leading and trailing edges, said leading edge being a cutting edge, a pair of body members mounted on said blade and said body members defining rakes, each of said body members including a first portion provided with a plurality of spaced apart teeth, said first portion being inclined in a plane which is at an angle to a vertically disposed plane and said first portion being arranged angularly with respect to said blade, and said first portion being contiguous to the trailing edge of said blade, a second portion arranged angularly with respect to said first portion, and said second portion overlying a part of said blade and being secured to said blade, a vertically disposed third portion depending from said second portion, and a horizontally disposed fourth portion arranged at right angles with respect to said third portion, said fourth portion being arranged below said blade, and said second portion being provided with a sharp cutting edge which is arranged adjacent the leading edge of the blade.

2. In a lawn mower and rake, a horizontally disposed rotary blade having longitudinally extending leading and trailing edges, said leading edge being a cutting edge, a pair of body members mounted on said blade and said body members defining rakes, each of said body members including a first portion provided with a plurality of spaced apart teeth, said first portion being inclined in a plane which is at an angle to a vertically disposed plane and said first portion being arranged angularly with respect to said blade, and said first portion being contiguous to the trailing edge of said blade, a second portion arranged angularly with respect to said first portion, and said second portion overlying a part of said blade and being secured to said blade, a vertically disposed third portion depending from said second portion, and a horizontally disposed fourth portion arranged at right angles with respect to said third portion, said fourth portion being arranged below said blade, and said second portion being provided with a sharp cutting edge which is arranged adjacent the leading edge of the blade, said body members being arranged in spaced apart relation with respect to each other on said blade, said body members each being of one piece construction.

References Cited in the file of this patent

UNITED STATES PATENTS

| | | |
|---|---|---|
| 2,571,455 | Keiper | Oct. 16, 1951 |
| 2,697,322 | Watrous | Dec. 21, 1954 |
| 2,706,441 | Caldwell et al. | Apr. 19, 1955 |
| 2,764,865 | Pollard | Oct. 2, 1956 |
| 2,863,162 | Draughon | Dec. 9, 1958 |

FOREIGN PATENTS

| | | |
|---|---|---|
| 385,473 | Great Britain | Dec. 29, 1932 |